June 26, 1956 J. L. CULBERTSON Re. 24,171
LINE-CLEARING APPARATUS FOR A TELEPHONE SYSTEM
Original Filed Sept. 30, 1952
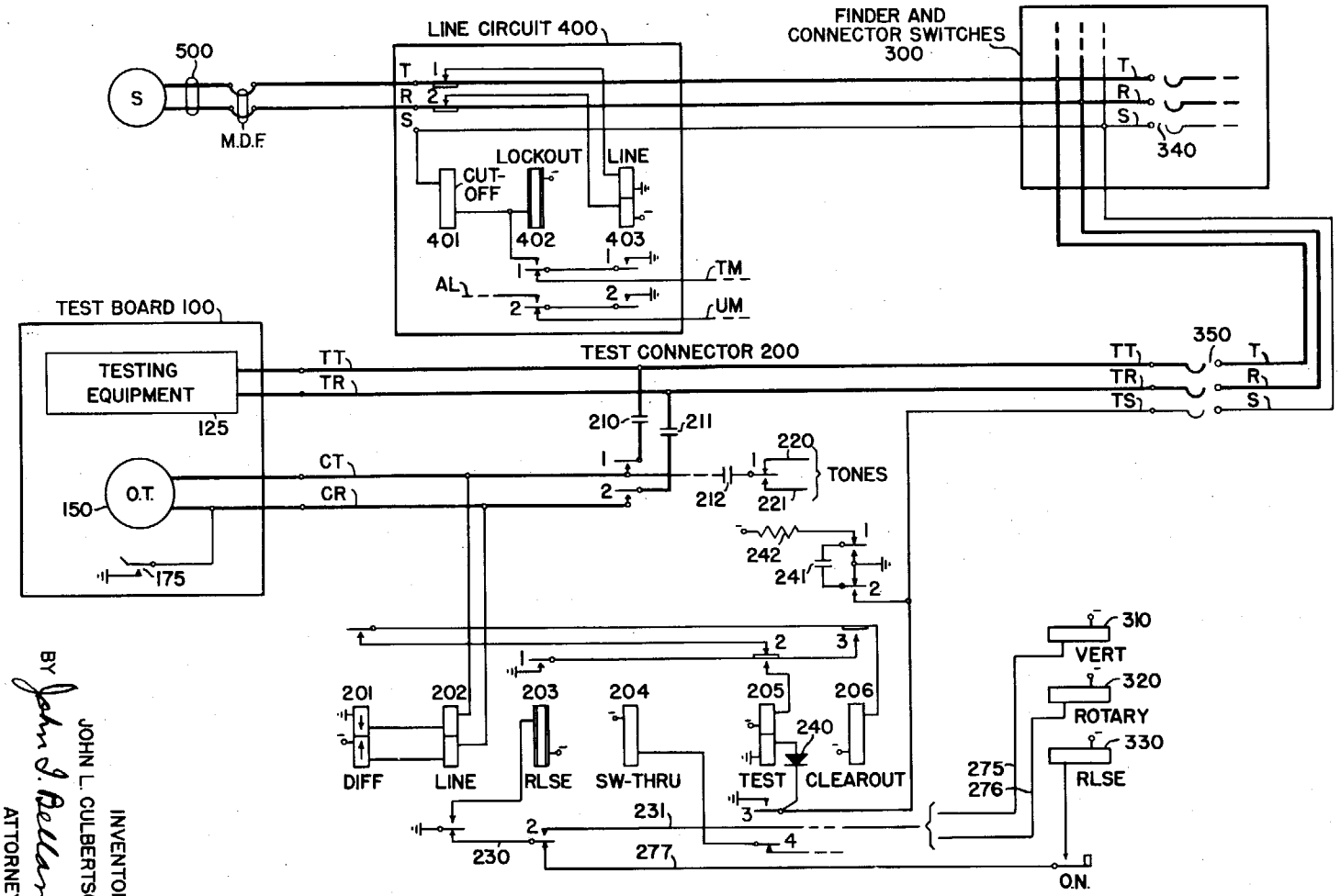
INVENTOR:
JOHN L. CULBERTSON
BY John J. Bellamy
ATTORNEY United States Patent Office Re. 24,171

Reissued June 26, 1956

24,171

LINE-CLEARING APPARATUS FOR A TELEPHONE SYSTEM

John L. Culbertson, Harvey, Ill., assignor to International Telephone and Telegraph Corporation, a corporation of Maryland Original No. 2,717,284, dated September 6, 1955, Serial No. 312,276, September 30, 1952. Application for reissue March 13, 1956, Serial No. 571,364

6 Claims. (Cl. 179—175.2)

Matter enclosed in heavy brackets [ ] appears in the original patent but forms no part of this reissue specification; matter printed in italics indicates the additions made by reissue.

This invention relates to improvements in line-clearing apparatus for a telephone system, being concerned particularly with the clearing of lines for test, as through a test connector.

Its principal object is to provide an improved line-clearing arrangement suitable for clearing the switchboard attachments from a line which has been locked out of normal service at its individual lockout line circuit responsive to an abnormal line condition.

General description

In order to facilitate the testing of telephone lines from a remote test board, test switching apparatus is commonly provided for extending a three-wire connection to the switchboard multiple of any desired line, regardless of its idle or busy condition. If idle, potential applied over the third wire (sleeve) of the connection acts to guard the called line and to clear it of its normal attachments so that such attachments will not adversely affect the line test.

If the line called from the test board tests busy and is in use, the test operator is expected to release the test connection and call back later. If the called line tests busy but is not in use, the test operator should be enabled to free the line switchboard attachments in preparation for its test. Known arrangements for performing this operation involve the forced restoration of the concerned line attachments (in this case the operated line relay) by temporarily connecting battery of opposed polarities to the respective conductors of the called line to shunt the windings of the connected line relay, or to set up a balanced differential current flow therein. Such arrangements, however, do not operate satisfactorily for a line having a low-resistance path between its conductors (a so-called close-in short).

The lines of unattended exchanges are commonly each provided with an individual lockout line circuit. The usual form of such a circuit includes a slow-releasing lockout relay serially related with a sleeve-connected cutoff relay. The cutoff relay when operated disconnects the line relay from the line conductors. The so-called lockout relay remains operated long enough after the cutoff relay restores that it becomes locked operated by the line relay which immediately reoperates if the line is shorted or grounded. The present invention provides an arrangement for clearing such a locked-out line by reoperating the cutoff relay over the sleeve wire of the three-wire test connection, notwithstanding the busy marked condition of the locked-out line.

An important feature of the invention relates to provisions for preventing premature operation of the test relay in the test switching apparatus incidental to applying sleeve current to operate the cutoff relay of the locked-out line. In the preferred embodiment, the free pole of a grounded reversed-polarity source is temporarily connected directly to the sleeve conductor of the test connection, and the test relay is rectifier poled to prevent its operation until sleeve current flows in the normal test direction responsive to the locked-out condition having been cleared.

A related important feature concerns the use of a suitably charged condenser and switching means for connecting it between ground and the sleeve to serve as the noted reversed polarity source, whereby the timing of the flow of clearing current is simply and efficiently accomplished.

Further objects and features of the invention will become apparent from the following description, reference being made to the accompanying drawing which discloses a diagrammatic view of a portion of a telephone system incorporating the principles of the present invention.

For purposes of making routine tests upon the telephone lines, a test board 100 is provided which has access to all lines in the exchange over test-board controlled automatic switching equipment including a test connector such as test connector 200. The bank of the test connector 200 is connected in multiple to the banks of the standard subscriber-controlled switching equipment through which calls are extended to desired lines. Test connector 200 is associated with test board 100 over a pair of test conductors TT and TR and a pair of control conductors CT and CR. The control pair is used to exercise control over the switchgear of test connector 200 from the test board operators' telephone and the test pair is connected to the testing equipment 125 and is used for testing purposes only.

The general procedure in making tests upon desired subscriber lines will now be described.

Assuming that the operator at test board 100 desires to make a test on line 500, the operators' telephone 150 is connected to test connector 200 over control wires CT and CR to seize the connector for use. Next, by means of a suitable calling device, the test connector apparatus is operated to cause its wiper set 350 to move into engagement with associated bank contacts multipled to line 500.

As will be explained in detail hereinafter, a test relay 205 determines if line 500 is busy or idle and accordingly transmits an identifying tone to the test board.

If the line to be tested is idle, test connector 200 automatically clears the line of switchboard apparatus, in this case line relay 403, and informs the operator at the test board that testing operations may begin and automatically renders the line busy to all other calls. The operator thereupon makes the desired tests upon line 500 from the testing equipment 150 over test conductors TT and TR, which as will be observed, is now connected directly to the line being tested. After the testing operations are completed, the test connector 200 is released and the line is returned to its normal idle condition.

If the line to be tested is busy from a call in progress or from a permanent condition existing on the line as by the line conductors accidentally being bridged or grounded, the operator receives a tone indicating a busy condition, ascertains which condition is causing the line to be busy, and accordingly releases the connection or forcibly clears the line.

Assuming the line to be busy from a call in progress, the operator at the test board 100 releases the test connection extended to line 500 by opening the usual bridge across the control conductors CT and CR to restore all operated switching apparatus.

Assuming the line is locked-out from a permanent condition on line 500, this condition being described hereinafter, the operator after finding no call in progress proceeds to clear the line for test. Operation of clear-out key 175 causes test connector 200 to cause a simulated booster battery to disconnect the switching equipment attached to line 500. Test connector 200 thereafter automatically transmits a tone to test board 100 indicating that the line is clear and testing operations may begin.

After completion of any desired tests on line 500, the operator releases the test connection and all operated switching apparatus by removing the bridge from across the control conductors CT and CR.

Detailed description

The procedure involved in clearing a telephone line of switchboard attachments in preparation for making test thereon having been described in general, a detailed description will now be given.

As hereinbefore pointed out, the condition of the line to be tested determines the procedure that the operator at the test board must follow in order to clear the line. Therefore, a brief description will be given of line circuit 400 under various line conditions.

Line circuit 400 is a three-relay line circuit individual to line 500 and including a line relay 403 normally connected to the line conductors T and R, a cutoff relay 401, and a lockout relay 402. A subscribers substation S is bridged across the conductors of line 500 which are connected to line circuit 400 through main distributing frame jumpers MDF and are terminated on switch set 340.

When line 500 is idle, the relays in line circuit 400 are in their illustrated position, with line relay 403 bridged across the tip and ring conductors through break contacts 1 and 2 of cutoff relay 401. At this time, battery potential from the battery connected winding of lockout relay 402 appears on the sleeve conductor S which terminates at its respective open contacts on switch set 340.

When line 500 is bridged by operation of the hookswitch (not shown) of substation S, an operate circuit is completed for line relay 403 from its battery and ground connected windings. Line relay 403 operates and at its contacts 1 and 2 and contacts 1 and 2 of lockout relay 402 ground the tens and units mark wires TM and UM to cause line-finding equipment (not shown) to extend the calling line through contacts on finder switches 300 to seize an idle connector (not shown) for extending a connection to a desired line.

Immediately following this line-finding action, ground is returned to the sleeve conductor S of line 500 from the seized connector thereby completing an operate circuit for cutoff relay 401 and lockout relay 402 in series.

Relays 401 and 402 operate. Break contacts 1 and 2 of cutoff relay 401 open the bridge across the windings of line relay 403 permitting it to restore. Contacts 1 and 2 of relay 402 open the mark wires TM and UM to prevent a reoperation of line relay 403 from starting a new line-finding action. The call is then extended to the desired line by operation of the calling device (not shown) at substation S in a normal manner. Relays 401 and 402 are the only relays operated in line circuit 400 during the time that a normal call is in progress.

If there is timing apparatus in the connector extending the call and a predetermined time has elapsed to open the connection while the line 500 is bridged by substation S having its hookswitch operated, ground is removed from the sleeve conductor S by such timing apparatus. This removal of ground from the sleeve opens the operate circuit of relays 401 and 402.

Cutoff relay 401 restores immediately and at its contacts 1 and 2 completes an operate circuit for line relay 403 again. Lockout relay 402, being slow-restoring due to its indicated sleeved core, is still operated when line relay 403 operates. Contacts 1 of relay 403 extend ground through make contacts 1 of relay 402 to the battery-connected winding of relay 402. Lockout relay 402 is now held operated and the line is in a locked-out condition with lockout relay 402 and line relay 403 operated. At its contacts 2, relay 402 extends the ground at contacts 2 of relay 403 to the alarm conductor AL to indicate to alarm equipment (not shown) that the line is locked-out.

If the line 500 became accidentally bridged or one of its conductors grounded, a calling condition would be simulated on line 500 and the above noted operations would ensue to eventually place the line in a locked-out condition.

Therefore, when line 500 is in an idle condition, line relay 403 is bridged across the line conductors; when line 500 is in a calling condition, switching apparatus in the connector (not shown) extending the call, is connected to the line conductors; and when line 500 is locked-out, the line relay 500 is bridged across the tip and ring conductors. In order for the operator to satisfactorily test line 500, the above noted switching apparatus must be removed first. The operations involved in clearing a line under the condition above noted will now be described in detail.

Assuming that the operator at test board 100 desires to test line 500, test connector 200 is seized by the bridging of control conductors CT and CR by any suitable control from the operator's telephone 150. An operate circuit is completed from the battery and ground connected windings of differential relay 201 for line relay 202.

Line relay 202 operates. Differential relay 201 does not operate at this time as its windings are differentially-connected, as indicated by the arrows, and the generated flux in its two windings are in opposition. Contacts on line relay 202 extend ground to the battery-connected winding of release relay 203 which operates and prepares a pulsing circuit for the vertical and rotary magnets associated with the switch contact set 350 of test conductor 200.

The operator at the test board 100 operates the usual calling device to cause the restoration and reoperation of line relay 202 according to the line number of line 500. The restoration and reoperation of line relay 202 generates impulses of ground which are transmitted over wire 230, through contacts 2 on relay 203 to wire 231, and through contacts not shown to pulse wire 275 and 276 causing the vertical and rotary magnets 310 and 320 to position wiper set 350 into engagement with the bank contacts terminating line conductors T, R, and S of line circuit 400.

Immediately upon being so positioned, the ground-connected winding of test relay 205 is extended to the sleeve conductor S of line circuit 400 over test sleeve conductor TS and rectifier 240. As will be described hereinafter, rectifier 240 serves to prevent condenser 241 from discharging through the winding of relay 205.

Assuming line 500 to be idle, current flow through the battery-connected winding of lockout relay 402 in series with the winding of cutoff relay 401 to the ground-connected winding of test relay 205 operates these three relays in series. Immediately upon operating, contacts 3 of relay 205 place ground directly on the sleeve conductor TS to hold relays 401 and 402 operated and to short-circuit rectifier 240 and the lower winding of relay 205. Relay 205 does not restore as it is held operated from the ground at contacts 1 of release relay 203 through the upper winding of relay 205 and its make contacts 2.

Operation of cutoff relay 401 causes line relay 403 to be disconnected from the tip and ring conductors of line 500, thereby clearing line 500 completely of all switchboard attachments. Make contacts 1 of test relay 205 place a suitable tone, such as trunk-ring-tone, on the control conductor CT through tone coupling condenser 212 and other contacts not shown, to inform the operator at test board 100 that line 500 is clear of switchboard attachments and ready for testing. Line 500 is busy to all calls being directed thereto by the ground on sleeve conductor S.

At this time, the tip and ring conductors of line 500 are connected directly to the testing equipment 125 over test conductors TT and TR. The operator thereupon operates the testing equipment to perform any desired tests and upon completion of such tests, opens the bridge circuit across the conductors CT and CR to restore line relay 202 of test connector 200. Line relay 202 restores and releases relay 203 which open-circuits test relay 205 and closes an operate circuit for the release magnet 330. Relay 205 restores and release magnet 330 operates from ground now appearing on wire 277 from back contacts of relays 202 and 203. This operate circuit includes the conventional off-normal contacts ON which are now closed as the vertical magnet is in an off-normal position. Operation of release magnet 330 causes the restoration of the rotary and vertical magnet armatures, and thereafter restores with the opening of the off-normal contacts ON. With switch set 350 being opened, test relay 205, cutoff relay 401 and lockout relay 402 restore. The line 500 and test connector 200 are now in their idle illustrated position.

If line 500 is busy from a normal call when a test connection is extended thereto in the manner previously described, the noted ground on the sleeve conductor S of line 500, from the connector (not shown) used in the extension of a connection, appears on the test sleeve conductor TS preventing the operation of test relay 205. Break contacts 1 of relay 205 place a busy-indicating tone, such as busy-tone, through condenser 212 to the control conductor CT in a manner hereinbefore described. Upon receipt of such a tone, the operator at test board 100 dials one additional digit to operate relay 204 over an operate circuit not shown to connect the control conductors CT and CR to test conductors TT and TR, respectively, and monitors the connection through condensers 210 and 211 to determine whether line 500 is busy from a normal call or a locked-out condition.

After determining that the line is busy from a call in progress, the operator opens the bridge across the control conductors and restores all operated equipment as previously described.

Assuming line 500 to be busy from a lockout condition, ground appears on the sleeve conductor S of line 500 from make contacts 1 of relays 402 and 403 as they are both operated as hereinbefore noted when the line is in a lockout condition. The operator monitors the connection to determine if a reverting call is in progress or if the line is accidentally locked-out. If the line is busy from a reverting call, the operator releases the connection as hereinbefore described.

Assuming that line 500 is in a locked-out condition from an accidental bridging of the line conductors or the grounding of one of them, the operator upon ascertaining that no call is in progress, proceeds to forcibly clear the line for test.

With the line and differential relays bridged across the control conductors and connected to battery and ground, the operator actuates release key 175 to ground the ring conductor CR thereby short-circuiting the upper winding of each of relays 201 and 202. Relay 202 remains operated from current flow through its lower winding and relay 201 immediately operates as there is no opposing flux generated in its short-circuited upper winding.

Contacts on differential relay 201 extend the ground potential at break contacts 1 of release relay 203 to the battery-connected winding of clearout relay 206 through break contacts 2 of non-operated test relay 205. Relay 206 operates and locks through its make contacts 3 to its operate ground independent of contacts on relay 201, which may be opened, when desired, by the restoration of release key 175 and the consequent release of relay 201. Contacts 1 and 2 of relay 206 place condenser 241 in circuit with the test sleeve conductor TS to forcibly remove line relay 403 from line 500.

In its normal illustrated position condenser 241 is fully charged, the negative pole being connected to the exchange battery through current-limiting resistor 242 and break contacts 1 and the positive pole being connected to ground through break contacts 2. With the operation of clearout relay 206, the negative pole of condenser 241 is transferred from resistor 242 to ground potential at contacts 1 of relay 206 and the positive pole is transferred to the test sleeve conductor TS through make contacts 2. The charge on condenser 241 is therefore impressed upon the sleeve conductor TS placing it at a potential, exchange battery voltage, above the ground potential maintaining lockout relay 402 operated.

Condenser 241 discharges through the winding of cutoff relay 401 to ground at make contacts 1 of line relay 403, it being prevented from discharging through the winding of test relay 205 by action of rectifier 240.

Cutoff relay 401 operates from the condenser discharge current flowing therethrough and at its contacts 1 and 2 open-circuits line relay 403.

Line relay 403 restores and at its contacts 1 opens one operate circuit of lockout relay 402. Relay 402 remains held operated in series with the cutoff relay from the discharging current of condenser 241.

When condenser 241 is discharged, the sleeve conductor S reaches a potential indicative of an idle condition and the ground-connected winding of test relay 205 being connected over sleeve conductor TS to the battery-connected winding of lockout relay 402 in series with cutoff relay 401, operates and locks operated as hereinbefore described to maintain relays 401 and 402 operated in series.

Contacts on test relay 205 removes the busy indicating tone, short-circuits its lower winding and rectifier 240, and at its contacts 4 restore switch-through relay 204 to disconnect the control conductors from the test conductors to free line 500 for test. The ground on the sleeve conductor S from make contacts 3 of relay 205, busy line 500 to all calls thereto.

After the operator performs the desired test on line 500, all operated switching apparatus is restored to normal as hereinbefore described and condenser 241 is charged again in preparation for another line-clearing operation.

I claim:

1. In a switching system, lines and switching apparatus common thereto for extending connections between respective calling and called lines, individual sleeve conductors and individual line equipments for respective lines, each line equipment including a normally connected line attachment and a cutoff relay for disconnecting it, a current source having first and second poles, the cutoff relay being normally connected serially in a circuit path extending between the first pole of the current source and the associated sleeve conductor, means in each line equipment for locking the associated line out of normal service, including means for effectively transferring the cutoff relay thereof from connection with the first pole into connection with the second pole of the current source, a test board and means controllable therefrom for operating a portion of said switching apparatus to extend a test connection to any desired line, including a connection to its associated sleeve conductor from the said second pole of the current source, said test connection being extended in preparation for testing the selected line with the line attachment thereof disconnected therefrom, means rendering the consequent current flow over the said sleeve connection sufficient to operate the cutoff relay when the selected line is idle, but not when such line is in the said locked-out condition, and means controllable from said test board for substituting a potential on the sleeve connection of such a value and polarity that the resulting current flow operates the cutoff relay of a selected locked-out line, whereby the line attachment thereof is disconnected to permit the desired test of the selected line to be made.

2. In a switching system according to claim 1, means in the line equipment of any selected locked-out line for terminating the locked-out condition thereof responsive to operation of its cutoff relay, thereby effectively transferring the cutoff relay back into connection with the first pole of the current source, the said means for placing a substitute potential on the sleeve connection including timing means for terminating the substitution after sufficient time has elapsed for the locked out condition of the selected line to have been terminated.

3. In a switching system, lines and switching apparatus common thereto for extending connections between respective calling and called lines, individual sleeve conductors and individual line equipments for respective lines, each line equipment including a normally connected line attachment and a cutoff relay for disconnecting it, a current source having first and second poles, the cutoff relay being normally connected serially in a circuit path extending between the first pole of the current source and the associated sleeve conductor, means in each line equipment for locking the associated line out of normal service, including means for effectively transferring the cutoff relay thereof from connection with the first pole into connection with the second pole of the current source, a test board and means controllable therefrom for operating a portion of said switching apparatus to extend a test connection to any desired line, including a connection to its associated sleeve conductor from the said second pole of the current source, said test connection being extended in preparation for testing the selected line with the line attachment thereof disconnected therefrom, means rendering the consequent current flow over the said sleeve connection sufficient to operate the cutoff relay when the selected line is idle, but not when such line is in the said locked-out condition, said sleeve connection including a test relay connected serially therein between the sleeve conductor and the second pole of the current source, means controlled by current flow through said test relay for indicating whether or not the line attachment has been disconnected from the selected line, means for making and thereafter nullifying a second connection to the sleeve conductor of the called line in parallel with the said sleeve connection to place a higher potential on the sleeve conductor of the same polarity as the second pole of the current source, whereby the cutoff relay is operated to terminate the locked out condition and remains operated over the initial sleeve connection after the said second connection has been nullified, and polarizing means for preventing the test relay from responding to current flow over the said second sleeve connection.

4. In a switching system according to claim 3, the said means for making and thereafter nullifying a second connection to the sleeve conductor including a normally-charged condenser whereby the charge thereon supplies the said higher potential, and the said second connection is nullified responsive to the condenser becoming discharged.

*5. In a switching system, communication links and first switching means for extending connections respectively thereover, means including a separate electromagnet for each link for controlling the first switching means, circuit elements for each link providing an incomplete circuit path for the electromagnet of the link through a direct-current source, control apparatus common to the links including a condenser and means for charging it in a given polarity direction, second switching means and means for selectively operating it to connect the control apparatus to any link, circuit elements included in the common apparatus and in the second switching means for completing the said incomplete circuit path of the electromagnet of the connected link by connecting the charged condenser in series therewith in series-aiding relationship to the potential of the said current source therein, circuit elements providing a by-pass path around the condenser including a by-pass rectifier serially related therein and so poled as to resist discharge of the condenser therethrough, whereby the electromagnet of the connected link is first energized by discharge current through the condenser and current source in series and is thereafter maintained energized by current through the rectifier and the current source in series.*

*6. In a switching system according to claim 5, the said second switching means and completing means being operable to complete discharge paths for the condenser through the said circuit paths of the said links in succession, means for providing interspersed idle intervals during which the said condenser is maintained out of discharge connection with all the said circuit paths, and means rendering the said means for charging effective during such idle intervals.*

References Cited in the file of this patent or the original patent

UNITED STATES PATENTS

| | | |
|---|---|---|
| 2,301,837 | Wiley et al. | Nov. 10, 1942 |
| 2,371,989 | Griffins et al. | Mar. 20, 1945 |
| 2,541,589 | Kessler | Feb. 13, 1951 |